US012668431B2

(12) United States Patent
Brunone

(10) Patent No.: US 12,668,431 B2
(45) Date of Patent: Jun. 30, 2026

(54) SUPPORT FRAME FOR A BELT CONVEYOR, ASSOCIATED CONVEYOR AND MOUNTING METHOD

(71) Applicant: René Brunone, Saint-Marcel (FR)

(72) Inventor: René Brunone, Saint-Marcel (FR)

( * ) Notice: Subject to any disclaimer, the term of this patent is extended or adjusted under 35 U.S.C. 154(b) by 148 days.

(21) Appl. No.: 18/700,673

(22) PCT Filed: Oct. 18, 2022

(86) PCT No.: PCT/EP2022/078920
§ 371 (c)(1),
(2) Date: Apr. 11, 2024

(87) PCT Pub. No.: WO2023/066903
PCT Pub. Date: Apr. 27, 2023

(65) Prior Publication Data
US 2025/0002258 A1       Jan. 2, 2025

(30) Foreign Application Priority Data
Oct. 19, 2021       (FR) ........................................ 2111111

(51) Int. Cl.
*B65G 21/06*       (2006.01)
*B65G 21/08*       (2006.01)
(52) U.S. Cl.
CPC ............. *B65G 21/06* (2013.01); *B65G 21/08* (2013.01); *B65G 2207/30* (2013.01)
(58) Field of Classification Search
CPC .... B65G 21/06; B65G 21/08; B65G 2207/30; B65G 21/02; B65G 21/04
USPC ................................................. 198/828–830
See application file for complete search history.

(56) References Cited

U.S. PATENT DOCUMENTS

| | | | | | |
|---|---|---|---|---|---|
| 3,191,761 A | * | 6/1965 | Reilly | .................. | B65G 39/145 |
| | | | | | 198/828 |
| 3,820,650 A | * | 6/1974 | Garvey | .................. | B65G 21/06 |
| | | | | | 198/860.1 |
| 3,844,404 A | * | 10/1974 | Emmenegger | ......... | B65G 21/08 |
| | | | | | 198/828 |
| 4,475,648 A | * | 10/1984 | Weeks | .................. | B65G 39/12 |
| | | | | | 198/860.1 |

(Continued)

FOREIGN PATENT DOCUMENTS

| | | |
|---|---|---|
| DE | 1797649 U | 10/1959 |
| FR | 2133531 A1 | 12/1972 |

(Continued)

OTHER PUBLICATIONS

DE 1797649 English Machine Translation.

(Continued)

*Primary Examiner* — Mark A Deuble
(74) *Attorney, Agent, or Firm* — Soquel Group LLC

(57)       ABSTRACT

The invention relates to a support frame for a belt conveyor, the support frame having a mount including two support elements, at least one upper belt support station and at least one removable assembly member, the upper belt support station resting in contact with the support elements, the upper support station being mounted on each of the support elements by way of at least one removable assembly member, and at least two holding stations that hold the support elements, the holding stations defining housings that receive a part of the ends of the support elements.

15 Claims, 8 Drawing Sheets

(56)  References Cited

U.S. PATENT DOCUMENTS

| | | | | |
|---|---|---|---|---|
| 5,350,053 | A | * | 9/1994 | Archer .................. B65G 15/62 |
| | | | | 198/525 |
| 5,353,920 | A | * | 10/1994 | Szalankiewicz ....... B65G 15/62 |
| | | | | 198/860.1 |
| 8,028,814 | B1 | * | 10/2011 | Szalankiewicz ....... B65G 21/02 |
| | | | | 198/840 |
| 11,383,933 | B2 | * | 7/2022 | Lurie ..................... B65G 69/18 |
| 2018/0111766 | A1 | * | 4/2018 | Brunone ............. B65G 41/008 |
| 2020/0071080 | A1 | * | 3/2020 | Wood .................... B65G 21/06 |

FOREIGN PATENT DOCUMENTS

| | | | |
|---|---|---|---|
| FR | 2824816 | A1 | 11/2002 |
| FR | 2876087 | A1 | 4/2006 |
| FR | 3029184 | A1 | 6/2016 |
| GB | 2187253 | A | 9/1987 |
| WO | 2009130680 | A1 | 10/2009 |

OTHER PUBLICATIONS

FR 2111111, INPI Rapport de Recherche Preliminaire, May 26, 2022, 2 pages.
PCT /EP2022/078920, International Search Report, Jan. 19, 2023, 3 pages.

* cited by examiner

SUPPORT FRAME FOR A BELT CONVEYOR, ASSOCIATED CONVEYOR AND MOUNTING METHOD

CROSS-REFERENCE TO RELATED APPLICATIONS

This application claims benefit under 35 USC § 371 of PCT Application No. PCT/EP2022/078920 entitled SUPPORT FRAME FOR A BELT CONVEYOR, ASOCIATED CONVEYOR AND MOUNTING METHOD, filed on Oct. 18, 2022 by inventor René Brunone. PCT Application No. PCT/EP2022/078920 claims priority of French Patent Application No. 21 11111, filed on Oct. 19, 2021.

FIELD OF THE INVENTION

The present invention relates, according to a first aspect, to a support frame for belt conveyor.

BACKGROUND OF THE INVENTION

Belt conveyors are commonly used on construction sites to transport excavation or embankment materials, avoiding the transport of such materials by vehicles such as trucks. The belt conveyors include a succession of supporting frames arranged one after the other, the moving belt being supported by the supporting frames throughout the path thereof. The support frames generally include a mount on which belt support stations are fastened, e.g. by using clamping nuts.

On construction sites, especially with very large surface areas, it is necessary to have conveyors that can be installed and dismantled easily.

Support frames formed by a set of metal profiles connected to each other by bolting, are known. The implementation of such a conveyor requires the mounting on the site of the whole frame, then the complete dismantling thereof in preparation of a possible re-mounting of the conveyor at another place on the site.

The structure of such type of conveyor makes mounting and disassembly time-consuming and tedious.

SUMMARY OF THE DESCRIPTION

The subject matter of the invention is to provide a support frame for a belt conveyor, which would be easily and quickly assembled and disassembled. Thereby facilitating the storage thereof by limiting the number of parts.

To this end, the subject matter of the invention is a support frame for a belt conveyor, the support frame comprising:

- a mount comprising two support elements, each support element extending between two ends along a direction substantially parallel to a longitudinal direction,
- at least one upper belt support station and at least one removable assembly member, the upper belt support station resting on the support elements along a direction substantially perpendicular to the longitudinal direction, the upper support station being mounted on each of the support elements with at least one removable assembly member,
- at least two holding stations holding the support elements, the holding stations defining housings receiving a part of the ends of the support elements.

Thereby, the mounting of the support frame is easy and quick. The mount has a limited number of elements. The mounting of the elements of the mount is carried out by inserting the ends of the support elements into the holding stations without the need for nuts and bolts. The holding stations provide good hold of the support frame. Each upper belt support station is easily installed by the operator because the station rests on the mount. Thereby, one operator can proceed to assemble the support frame.

According to other particular embodiments, the support frame comprises one or more of the following features, taken individually or according to all technically possible combinations:

- the upper belt support station extends between two ends, each end partially surrounding one of the two support elements;
- each support element comprises a main section extending along a direction substantially parallel to the longitudinal direction and two end sections on both sides of the main section, the end sections extending along directions substantially perpendicular to the longitudinal direction, the end sections being partially received in the housings of the holding stations;
- each housing extends along a main direction, the housing comprising a lower part along the main direction, a section of the lower part according to a plane substantially perpendicular to the main direction being polygonal, preferentially pentagonal, at least a part of the end of the support elements having a matching cross-section;
- the frame comprises at least one arch and at least two arch support members, each arch support member having a first portion mounted by engaging on the upper belt support station, and a second portion mounted by engaging on one end of the arch;
- each arch support member defines a receiver housing intended to hold a cable; and
- the frame includes at least two upper belt support stations each extending between two ends and resting on the support elements, at least two arches, at least four arch support members mounted on the ends of the upper belt support stations, a tarpaulin resting on the two arches, the tarpaulin covering the upper belt support stations.

According to a second aspect, the invention further relates to a belt conveyor including a plurality of support frames as described hereinabove and at least one movable belt supported by the support frames.

According to a third aspect, the invention relates to a method of mounting a support frame as described hereinabove, comprising the following steps:

- inserting the ends of the support elements into the housings of the holding stations,
- positioning the upper belt support station against each of the support elements,
- fastening the upper belt support station with a removable assembly member on each of the support elements.

According to a particular embodiment, the support frame includes at least one arch and at least two arch support members, the method comprising the following steps:

- mounting by engaging the arch support members on each of the ends of the upper belt support station,
- mounting by engaging the arch on the arch support members.

BRIEF DESCRIPTION OF THE DRAWINGS

The invention will be better understood upon reading the following description, given only as an example and making reference to the enclosed drawings, amongst which.

DETAILED DESCRIPTION OF EMBODIMENTS

Figure 1:
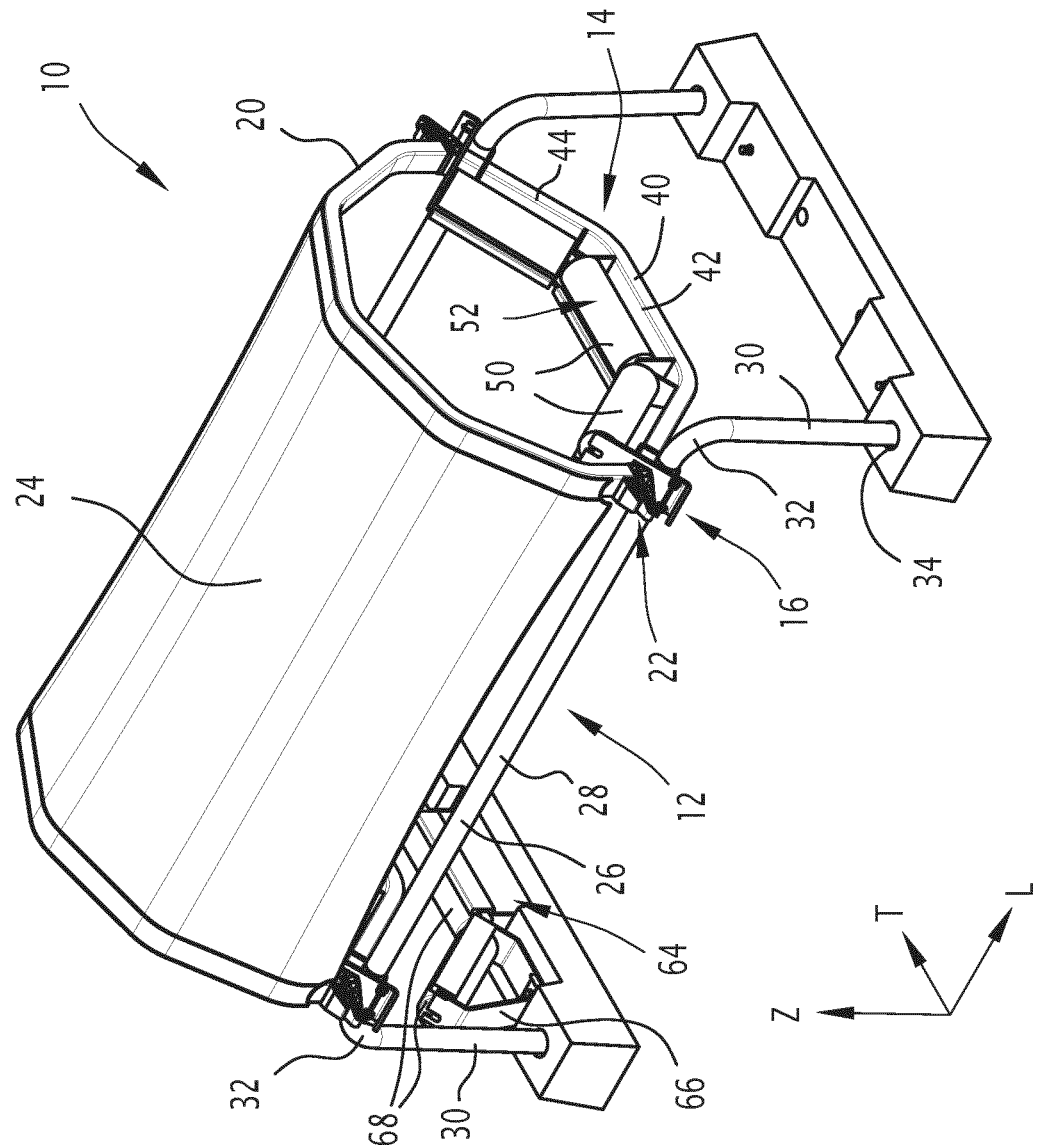
FIGS. 1 and 2 are perspective views of a support frame for a belt conveyor according to the invention.
Figure 2:
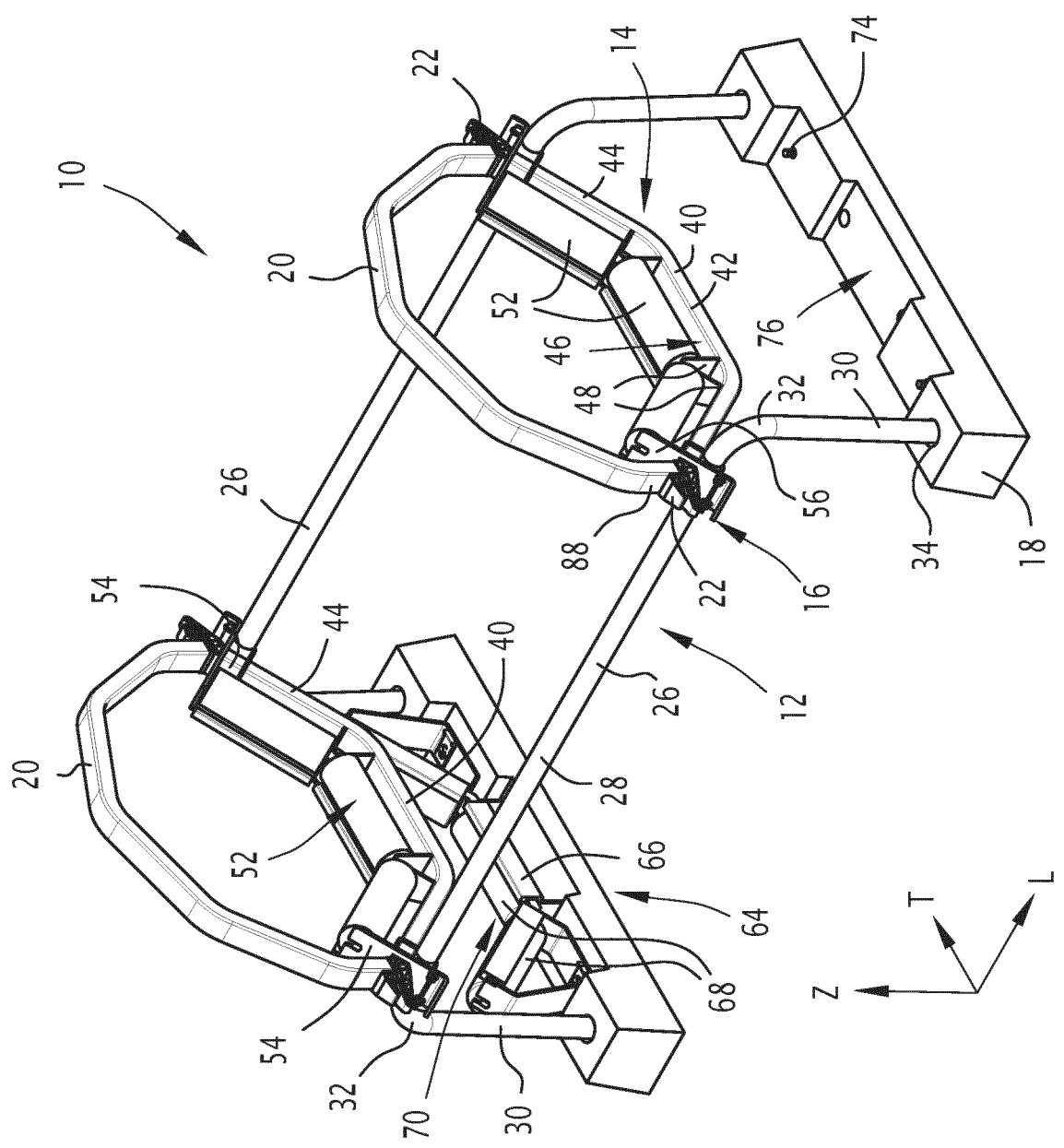
Figure 3:
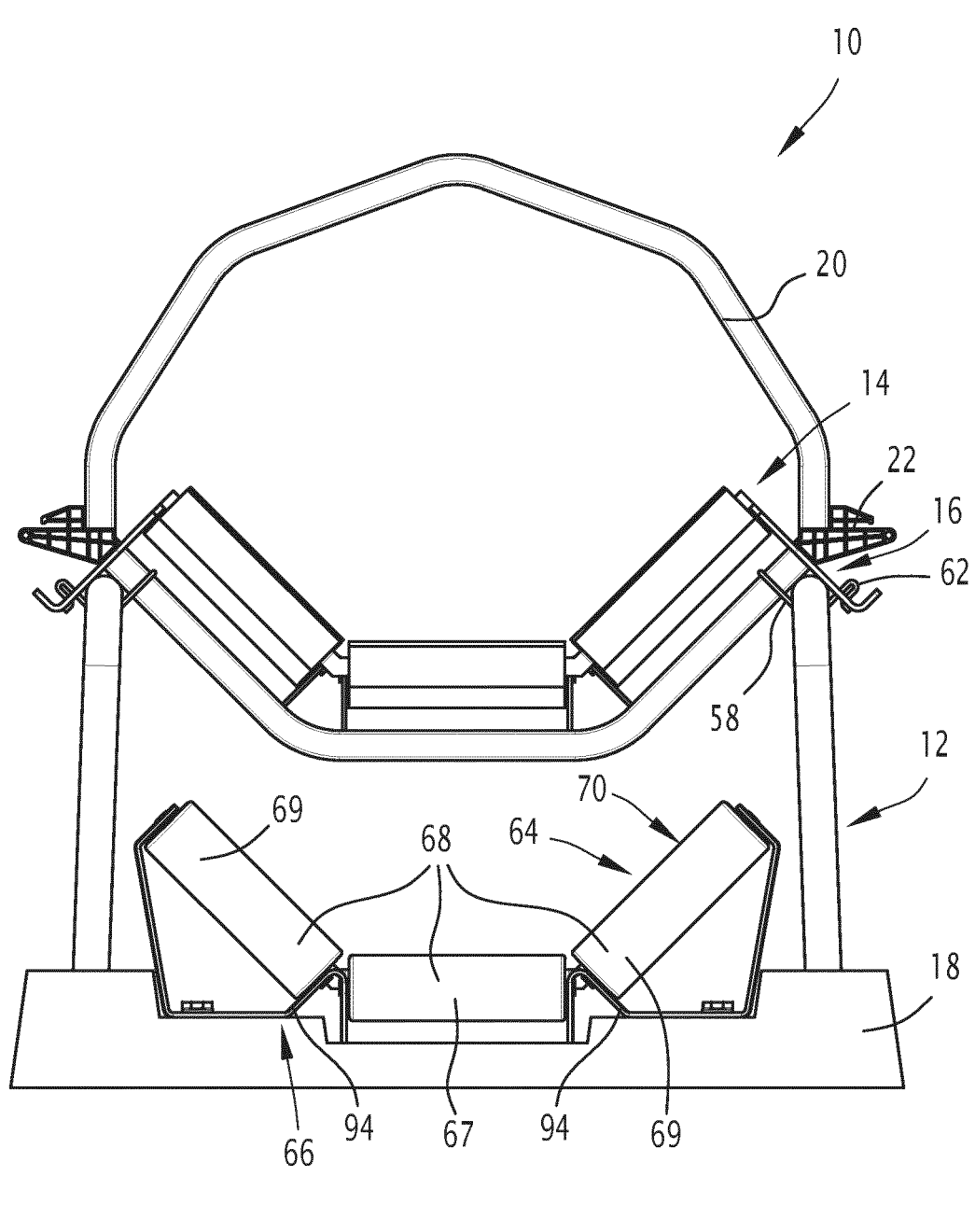
FIG. 3 is a side view of the support frame shown in the FIGS. 1 and 2, FIGS. 4 to 8 are detailed views of certain elements of the support frame shown in FIGS. 1 and 2.

FIGS. 1 to 3 show a support frame 10 for a belt conveyor according to the invention. The support frame 10 is intended to be implemented in a belt conveyor including a plurality of such support frames 10 arranged one after the other along the length of the conveyor. Hereinafter in the description, reference is made to a longitudinal direction L corresponding to the length of the conveyor, i.e. to the direction of movement of the belt. The transverse direction T, substantially perpendicular to the longitudinal direction, corresponds to the width of the conveyor. The direction of elevation Z corresponds to the height of the conveyor. Same is substantially perpendicular to the longitudinal direction and to the transverse direction T.

Hereinafter in the description, the terms "upper" and "lower" are relative to the direction of elevation Z. Thereby, an "upper" element is arranged above a "lower" element along the direction of elevation Z.

The belt conveyor includes a conveyor belt (not shown), known in the prior art, folded back on itself, and a belt drive device (not shown) for setting the belt in motion, also known from the prior art.

The belt is folded back on itself to form a loop.

The belt comprises an upper strip for conveying the products and a lower strip for returning the belt in the direction opposite to the direction of conveying the products.

The support frames 10 are e.g. regularly distributed along the longitudinal direction, e.g. spaced apart by 5 to 10 m.

Each support frame 10 includes a mount 12, at least one upper belt support station 14, at least one removable assembly member 16 for fastening the upper belt support station 14 to the mount 12, and at least two holding stations 18.

In the example illustrated, the support frame 10 includes exactly two upper belt support stations 14 mounted on the mount 12 and exactly two holding stations 18.

Advantageously, in the embodiment shown, the support frame 10 further comprises two arches 20 mounted on the upper belt support stations 14, four arch support members 22 mounted on the upper belt support stations 14, and a tarpaulin 24.

According to the invention, the mount 12 comprises two support elements 26, preferentially identical to each other. Each support element 26 extends along a main direction substantially parallel to the longitudinal direction L. In other words, the two support elements 26 extend along mutually parallel directions. Each support element 26 comprises a main section 28 and two end sections 30 arranged on both sides of the main section 28. The main section 28 and the end sections 30 are e.g. interconnected by bent sections 32. The main section 28 extends along a direction substantially parallel to the longitudinal direction L. The end sections 30 each extend along a direction substantially parallel to the direction of elevation Z.

Each support element 26 is e.g. tubular. Each support element 26 is e.g. made of one piece, i.e. the main section 28, the end sections 30 and any bent sections 32 are integral with each other.

In a variant, each support element 26 is formed by assembling a plurality of elements engaged with one another. The transport of the different elements forming the mount 12 is thereby facilitated.

In a further variant, each support element 26 is formed by welding a plurality of elements.

The end sections 30 are partly received in the holding stations 18.

Figure 4:
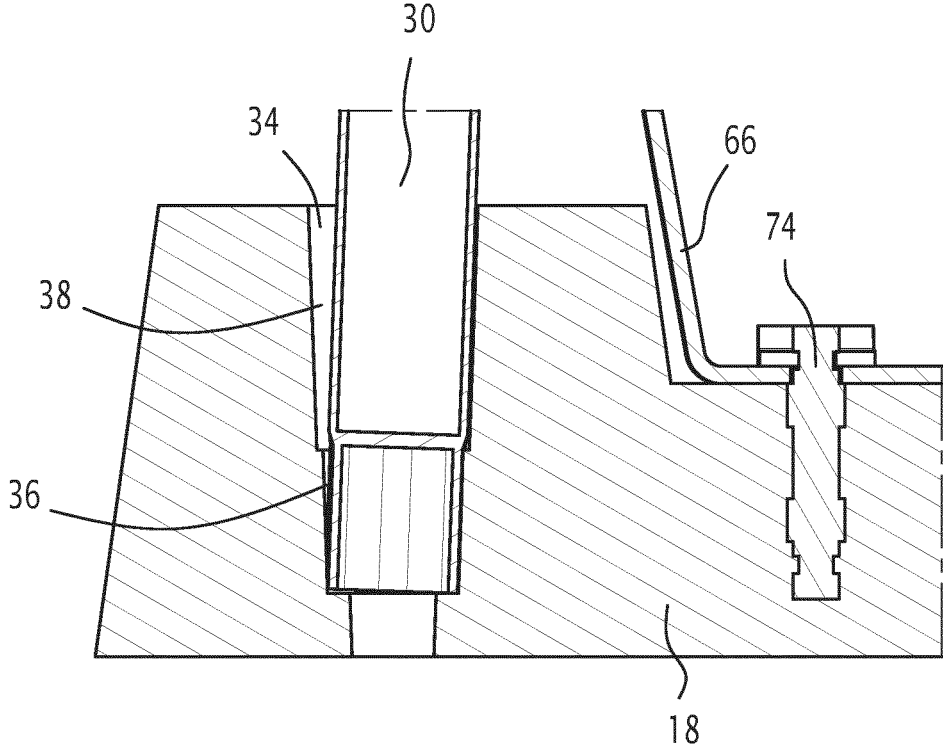

The holding stations 18 are intended to hold the support elements 26. The holding stations 18 are intended to be in contact with the ground on which the support frame 10 is arranged. The holding stations 18 extend along directions substantially parallel to the transverse direction T. Each holding station 18 defines two housings 34 (FIG. 4) each extending along a main direction substantially parallel to the direction of elevation Z. The housings 34 are arranged at each of the ends of the holding stations 18. The distance along the transverse direction T between the two support elements 26 is comprised e.g. between 1 m and 2 m. Each housing 34 comprises a lower part 36 and an upper part 38 along the main direction of the housing 34. Advantageously, at least the lower part 36 has a polygonal section along a plane substantially perpendicular to the main direction. For example, the cross-section is pentagonal. It is in thereby possible to block the rotation of the ends of the support elements 26 along the direction Z.

The end of the support elements 26, i.e. at least part of the end sections 30, received in the housing 34, has a matching section. It is thereby possible to provide a good holding by locking the support elements 26 in the holding stations 18.

The holding stations 18 are preferentially made of concrete. Same thereby serve to ballast the support frame 10 on the ground, improving the stability thereof.

The support frame 10 preferentially comprises two upper belt support stations 14 resting on the support elements 26 along directions substantially perpendicular to the longitudinal direction L, i.e. substantially parallel to the transverse direction T.

The upper belt support stations 14 support the upper strip of the belt.

Each upper belt support station 14 includes a support 40 formed e.g. by a bent element. More particularly, the support 40 comprises a central portion 42 and two lateral portions 44 connected to the central portion 42 and extending on both sides of the central portion 42. The central portion 42 extends mainly along a direction substantially parallel to the transverse direction T. Each lateral portion 44 extends along a direction forming an angle comprised between 20° and 60° with the main direction of extension of the central portion 42.

The support 40 comprises, on the upper surface 46 thereof, lugs 48 and a plurality of rotary rollers 50 supported by the lugs 48. The rotary rollers 50 are arranged along the direction of extension of the support 40. The rotary rollers 50 define a hollow supporting surface 52 receiving the belt. More particularly, in the example illustrated, each upper belt support station 14 comprises three rotary rollers 50 fastened to each of the central 42 and the lateral 44 portions of the support, respectively.

Figure 5:
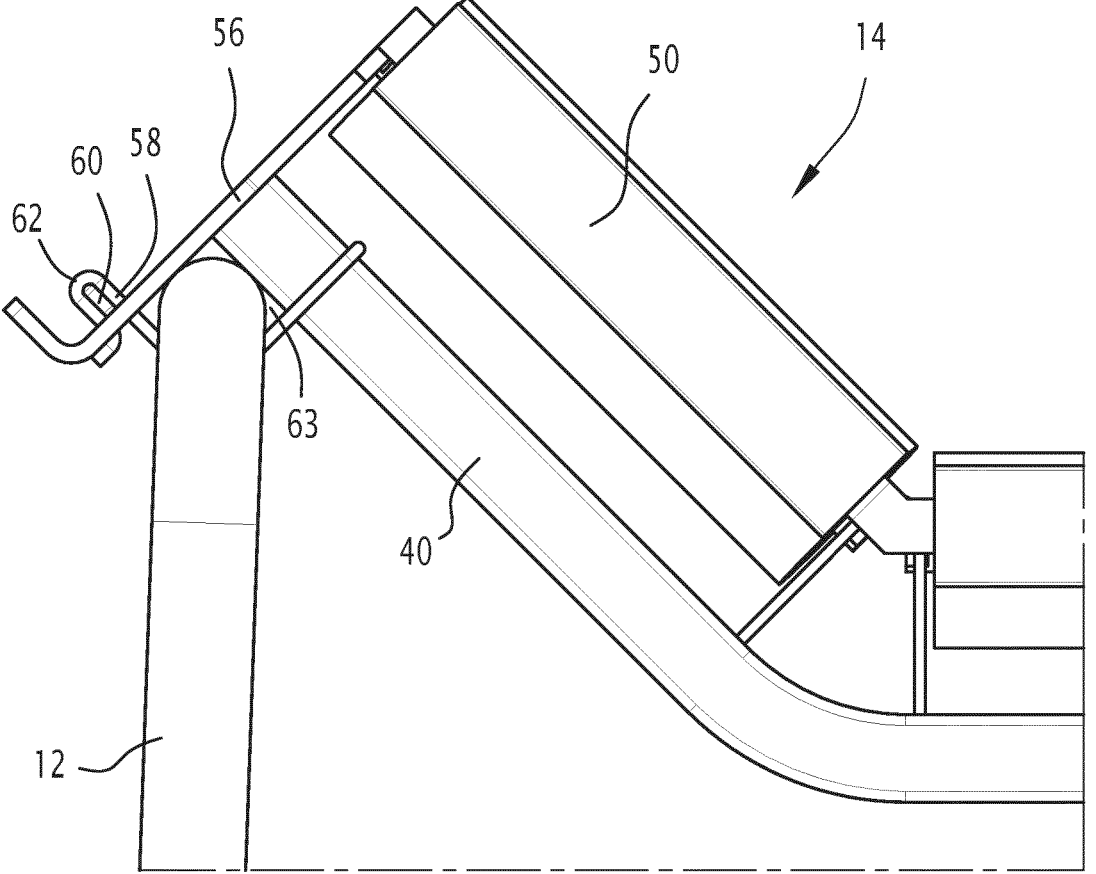

Each upper belt support station 14 extends between two ends 54. Each end 54 partially surrounds one of the two support elements 26 of the mount 12 around a direction substantially parallel to the longitudinal direction L (FIG. 5).

More particularly, the upper belt support station 14 comprises a holding lug 56 fastened to each of the ends of the lateral portions 44 of the support 40. The holding lug 56 preferentially extends along a direction substantially perpendicular to the main direction of extension of the corresponding lateral portion 44. The holding lug 56 preferentially defines at least two through openings receiving a portion of the removable assembly member 16.

In the embodiment illustrated, the support frame 10 comprises two removable assembly members 16 for fastening each upper belt support station 14, more particularly at each of the ends 54.

Each removable assembly member 16 comprises e.g. a clip 58 and a locking member 60. The locking member 60 is e.g. a bar.

The clip 58 is e.g. formed by a deformed rod. The clip 58 comprises two ends 62 and a holding space 63 between the two ends 62. The holding space 63 surrounds the end 54 of the upper belt support station 14. The ends 62 of the clip 58 are curved and received through the through openings of the holding lug 56. The ends 62 and the holding lug 56 define internally therebetween, two spaces receiving the locking member 60. Thereby, the locking member 60 holds the clip 58 around the end 54 of the upper belt support station 14 and the support element 26 of the mount 12.

Preferentially, as illustrated in FIGS. 1 to 3, the support frame 10 comprises at least one lower belt support station 64.

The lower belt support station 64 supports the lower strip of the belt.

The lower belt support station 64 comprises e.g. a support 66 and a plurality of rotary rollers 68 mounted on the support 66. In the example illustrated (FIG. 3), the lower belt support station 64 comprises exactly three rotary rollers 68, and more particularly a central roller 67 and two lateral rollers 69 on both sides of the central roller. The rotary rollers 68 define a hollow bearing surface 70 receiving the belt, and more particularly the lower strip of the belt. In the example illustrated, the support 66 defines two through openings.

More particularly, in the example illustrated, the support 66 comprises two support members 94 each freely received in an opening in the holding station 18. Each support member 94 supports one end of the central rotary roller 68 and one of the lateral rotary rollers 69.

Each support member 94 is movable in rotation with respect to the holding station 18 along an axis of rotation substantially parallel to the direction of elevation Z passing through the orifice of the holding station 18. It is thereby possible to adjust the relative position of the lateral rotary rollers 69 with respect to the central rotary roller 67, in particular in the curves of the conveyor. More particularly, the support members 94 can be positioned on the holding station 18 independently of each other. Each support member 94 defines a through opening.

Each support member 94 is mounted on the holding station 18 by means of a removable assembly system 72.

Figure 8:
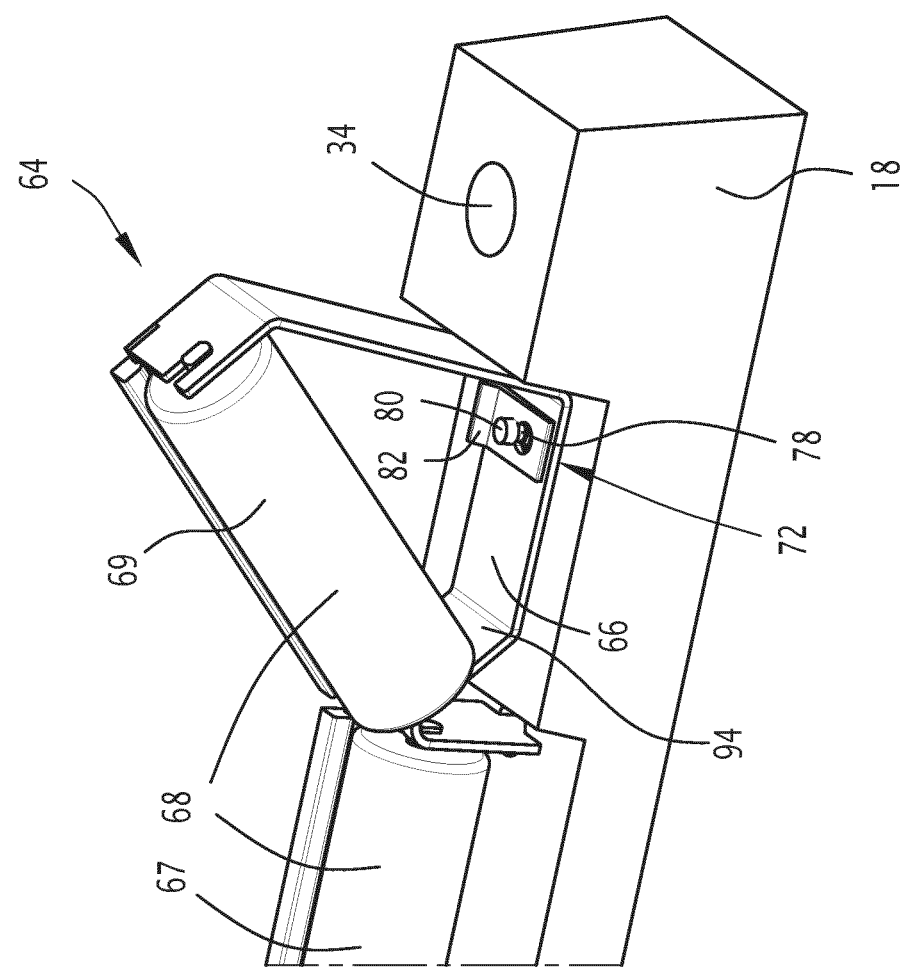

For example, as can be seen in particular in FIG. 8, each assembly system 72 comprises a stud 74 protruding from an upper surface 76 of the holding station 18 and passing through the through opening of the support member 94. The stud 74 includes a rod 78 fastened to the holding station 18, and a head 80 connected to the rod 78. The assembly system 72 further comprises a blocking element 82 interposed between the head 80 and the support member 94 of the lower belt support station 64.

Figure 7:
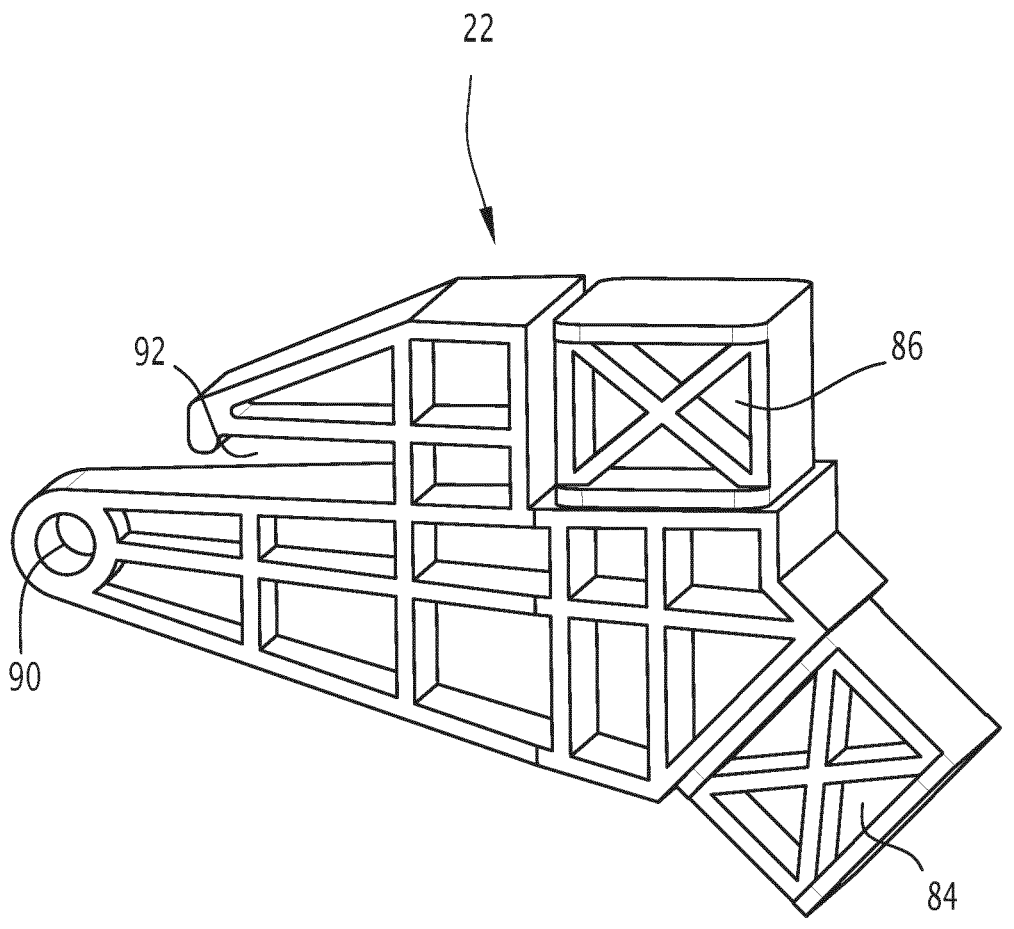

Each arch support member 22 (FIG. 7) has a first portion 84 mounted by engaging on the upper belt support station 14, and a second portion 86 receiving by engaging one end 88 of the arch 20.

More particularly, in the embodiment shown, each end 54 of the upper belt support station 14 defines a housing receiving the first portion 84 of the arch support member 22.

In a variant, the first portion 84 of the arch support member 22 defines a housing receiving the end 54 of the upper belt support station 14.

Similarly, the end 88 of the arch 20 defines a housing receiving the second portion 86 of the arch support member 22.

In a variant, the second portion 86 of the arch support member 22 defines a housing receiving the end 88 of the arch 20.

Advantageously, the arch support member 22 defines a receiver housing 90 intended to hold a cable, e.g. a cable connected to an emergency stop system of the conveyor. As a variant or in addition, the arch support member 22 further defines a passage 92 intended to receive at least one fastening element of the tarpaulin 24, such as a strap.

The arch support member 22 is made e.g. of plastic.

For example, the arch support member 22 is obtained by molding.

The support frame 10 comprises as many arches 20 as there are upper belt support stations 14. In the example illustrated, the support frame 10 comprises two arches 20 arranged above each of the upper belt support stations 14 along the direction of elevation Z.

Each arch 20 has a curved shape, preferentially substantially U-shaped, oriented toward the bearing surface 52 of the rotary rollers 50 of the upper belt support station 14. Each arch 20 is e.g. made in one piece. In a variant, each arch 20 is formed by a plurality of elements fastened together.

For example, the tarpaulin 24 is mounted on the arches 20 so as to cover at least the upper belt support stations 14 and the upper strip of the belt. The tarpaulin 24 is e.g. held on the arches 20 by means of a plurality of fastening elements. In a variant or in addition, the tarpaulin 24 is held on the arch support members 22 by means of one or a plurality of fastening elements, such as straps.

In a variant, the tarpaulin 24 extends as far as the holding stations 18 so as to also cover the lower belt support station 64, and more particularly the lower strip of the belt. The tarpaulin 24 is e.g. held on the holding stations 18 and/or on the support elements 26 of the mount 12.

Figure 6:
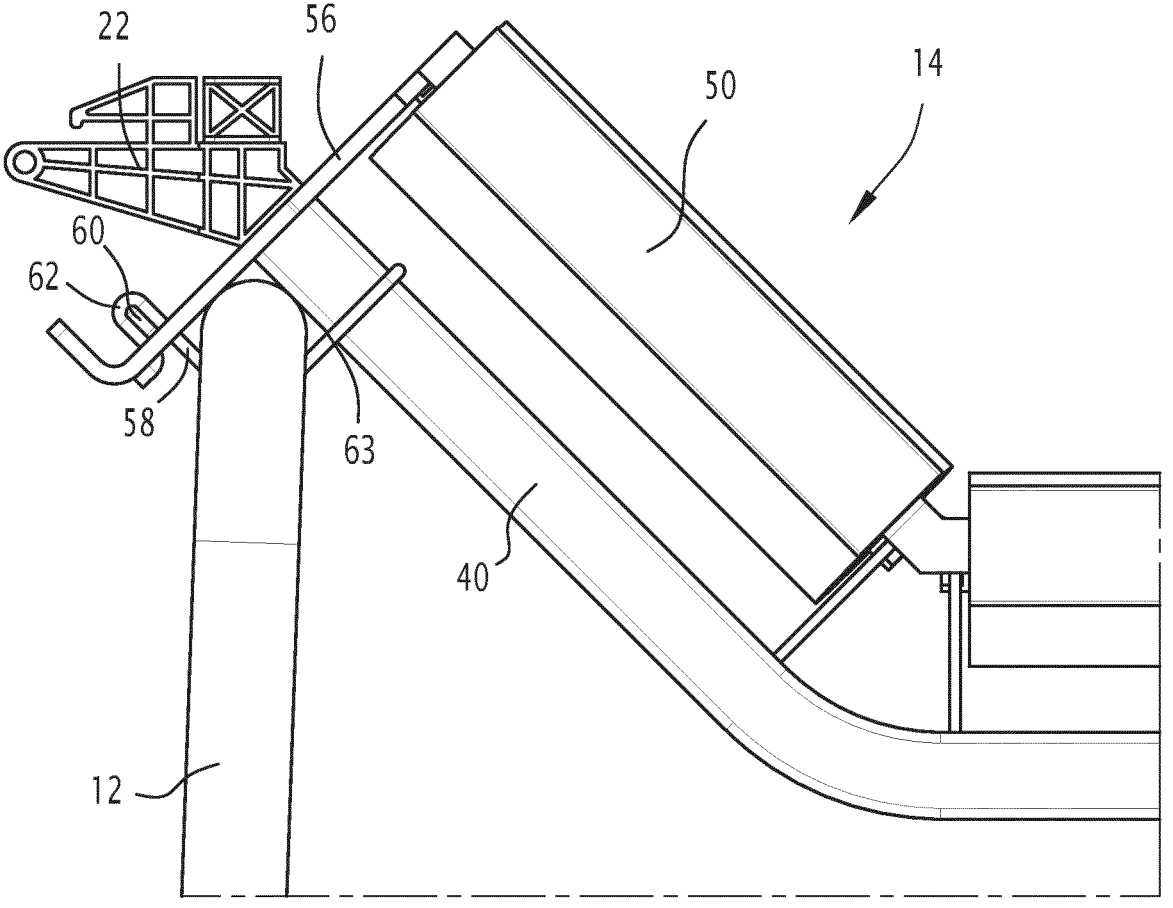

A method of mounting a support frame 10 as described hereinabove will now be described, more particularly with reference to FIGS. 5 and 6.

First of all, the ends of the support elements 26 are inserted into the housings 34 of the holding stations 18, making it possible to block the rotation of the support elements 26 along the direction Z.

The upper belt support stations 14 are then positioned bearing on each of the support elements 26 along a direction substantially parallel to the transverse direction T. Each upper belt support station 14 is stable on the support elements 26.

Each upper belt support station 14 is then fastened with a removable assembly member 16 on each of the support elements 26. In the example illustrated, the clip 58 is positioned so as to clamp each of the ends 54 of the upper belt support stations 14 and to hold the support element 26 between the clip 58 and the holding lug 56. The locking member 60 is then inserted to lock the mounting.

Preferentially, the lower belt support station 64 is mounted on one of the holding stations 18. More particularly, the lower belt support station 64 is placed in such a way that the studs 74 pass through the through openings of the support 66 of the lower belt support station 64. The lower belt support station 64 is locked to the holding station 18 by inserting the locking element 82 between the head 80 of the stud 74 and the support 66.

The arch support members 22 are then mounted by engaging on each of the ends 54 of each of the upper belt support stations 14. More particularly, the first portion 84 of the arch support members 22 is inserted into each of the housings of the ends 54 of the upper belt support stations 14.

The arches 20 are then mounted by engaging on the arch support members 22. More particularly, the second portion 86 of each of the arch support members 22 is inserted into the housings of the ends 88 of the arches 20.

Finally, the tarpaulin 24 is fixed to the arches 20 so as to cover at least the upper belt support stations 14, in a variant so as to cover the upper belt support stations 14 and the lower belt support station 64.

The support frame 10 according to the invention is particularly advantageous because same is easy and quick to assemble. The mount 12 has a limited number of elements. The mounting of the elements of the mount 12 is carried out by inserting the ends of the support elements into the holding station 18 without the need for nuts and bolts. The holding stations 18 provide a good hold of the support frame 10. The upper belt support station 14 is easily installed by the operator because the station rests on the mount 12. Thereby, one operator can proceed to assemble the support frame 10 without any other tools than the hammer.

The invention claimed is:

1. A support frame for a belt conveyor, the support frame including:
   a mount comprising two support elements, each support element extending between two ends along a direction substantially parallel to a longitudinal direction;
   at least one upper belt support station and at least one removable assembly member, each upper belt support station resting on said support elements along a direction substantially perpendicular to the longitudinal direction, each upper belt support station being mounted on each of said support elements with said at least one removable assembly member;
   at least one arch and at least two arch support members, each arch support member having a first portion mounted by engaging on said at least one upper belt support station, and a second portion mounted by engaging on one end of the at least one arch; and
   at least two holding stations that hold said support elements, the holding stations defining housings that receive a part of the ends of said support elements.

2. The frame according to claim 1, wherein each upper belt support station extends between two ends, each end partially surrounding one of said two support members.

3. The frame according to claim 1, wherein each of said support elements comprises a main section extending along a direction substantially parallel to the longitudinal direction and two end sections on both sides of the main section, the end sections extending along directions substantially perpendicular to the longitudinal direction, the end sections being partially received in the housings of said holding stations.

4. The frame according to claim 1, wherein each housing extends along a main direction, the housing comprising a lower portion along the main direction, a cross-section of the lower portion along a plane substantially perpendicular to the main direction being polygonal, at least a part of the end of said support elements having a matching cross-section.

5. The frame according to claim 1, wherein each of said at least two arch support members defines a receiver housing for holding a cable.

6. The frame according to claim 1, including:
   at least two upper belt support stations each extending between two ends and resting on said support elements;
   at least two arches;
   at least four arch support members mounted on the ends of said upper belt support stations; and
   a tarpaulin resting on said two arches, the tarpaulin covering said upper belt support stations.

7. A belt conveyor comprising:
   a plurality of support frames according to claim 1; and
   at least one movable belt supported by said support frames.

8. A method for mounting a support frame according to claim 1, comprising:
   inserting the ends of the support elements into the housings of the holding stations;
   positioning the at least one upper belt support station against each of the support elements; and
   fastening the upper belt support station with a removable assembly member on each of the support elements.

9. The method of mounting a support frame according to claim 8, the support frame including at least one arch and at least two arch support members, the method further comprising:
   mounting by engaging the arch support members on each of the ends of the at least one upper belt support station; and
   mounting by engaging the at least one arch onto the arch support members.

10. A support frame for a belt conveyor, the support frame including:
    a mount comprising two support elements, each support element extending between two ends along a direction substantially parallel to a longitudinal direction;
    at least one upper belt support station and at least one removable assembly member, each upper belt support station resting on said support elements along a direction substantially perpendicular to the longitudinal direction, each upper belt support station being mounted on each of said support elements with said at least one removable assembly member; and
    at least two holding stations that hold said support elements, the holding stations defining housings that receive a part of the ends of said support elements, wherein each housing extends along a main direction, each housing comprising a lower portion along the main direction, a cross-section of the lower portion along a plane substantially perpendicular to the main direction being pentagonal, at least a part of the end of said support elements having a matching cross-section.

11. The frame according to claim 10, wherein the upper belt support station extends between two ends, each end partially surrounding one of the two support members.

12. The frame according to claim 10, wherein each support element comprises a main section extending along a direction substantially parallel to the longitudinal direction and two end sections on both sides of the main section, the end sections extending along directions substantially perpendicular to the longitudinal direction, the end sections being partially received in the housings of the holding stations.

13. A belt conveyor including a plurality of support frames according to claim 10 and at least one movable belt supported by the support frames.

14. A method for mounting a support frame according to claim 10, comprising:

inserting the ends of the support elements into the housings of the holding stations, positioning the upper belt support station against each of the support elements, fastening the upper belt support station with a removable assembly member on each of the support elements.

15. The method of mounting a support frame according to claim 14, the support frame including at least one arch and at least two arch support members, the method comprising:

mounting by engaging the arch support members on each of the ends of the upper belt support station, mounting by engaging the arch onto the arch support members.

* * * * *